United States Patent
Webster (10) Patent No.: US 6,260,395 B1
(45) Date of Patent: Jul. 17, 2001

(54) VERTICALLY ORIENTED APPARATUS FOR BENDING TUBING, AND METHOD OF USING SAME

(75) Inventor: M. Craig Webster, Novi, MI (US)

(73) Assignee: Adaptive Motion Control Systems, Inc., Wixom, MI (US)

(*) Notice: Subject to any disclaimer, the term of this patent is extended or adjusted under 35 U.S.C. 154(b) by 0 days.

(21) Appl. No.: 09/454,096

(22) Filed: Dec. 3, 1999

Related U.S. Application Data (63) Continuation-in-part of application No. 08/611,396, filed on Mar. 5, 1996, now Pat. No. 5,862,697, which is a continuation-in-part of application No. 09/143,598, filed on Aug. 31, 1998, now Pat. No. 5,927,124.
(60) Provisional application No. 60/110,777, filed on Dec. 3, 1998.

(51) Int. Cl.$^7$ ........................................... B21D 7/04
(52) U.S. Cl. ................................................. 72/149
(58) Field of Search ............................. 72/157, 158, 159, 72/149

(56) References Cited

U.S. PATENT DOCUMENTS

| | | |
|---|---|---|
| 3,724,256 * | 4/1973 | Kroetch .................... 72/332 |
| 3,728,885 | 4/1973 | Ames . |
| 3,949,582 | 4/1976 | Eaton et al. . |
| 4,126,030 | 11/1978 | Zollweg et al. . |
| 4,552,006 | 11/1985 | Yogo . |
| 4,606,250 | 8/1986 | Krosbacher et al. . |
| 4,703,678 | 11/1987 | Kiuchi . |
| 4,760,727 | 8/1988 | Van Landingham . |
| 4,827,816 | 5/1989 | Takaniemi . |
| 4,872,384 | 10/1989 | Borzym . |
| 4,919,025 | 4/1990 | Synder . |
| 4,970,885 | 11/1990 | Chipp et al. . |
| 4,974,436 | 12/1990 | Nakatsuji . |
| 5,016,507 | 5/1991 | Riera . |
| 5,025,651 | 6/1991 | Del Fabro et al. . |
| 5,301,530 | 4/1994 | Beelen et al. . |
| 5,343,725 | 9/1994 | Sabine . |
| 5,499,522 * | 3/1996 | Schwarze ................ 72/157 |

* cited by examiner

*Primary Examiner*—Rodney A. Butler
(74) *Attorney, Agent, or Firm*—Carrier, Blackman & Associates, P.C.; William D. Blackman; Joseph P. Carrier (57) ABSTRACT

A vertically oriented tube bending apparatus includes a vertically oriented support frame, which takes up less floor space than the previously known tubing benders. A tube bending apparatus in accordance with the invention, generally, includes a support frame having a length, a width, and a height, wherein the greatest of these is the height. The apparatus further includes a tubing advance mechanism, attached to the support frame, for advancing a tubing workpiece along a substantially vertical path. A bend die is also provided which is rotatably attached to the support frame and pivotally movable about a pivot axis. The bend die has an outer side edge with an arcuate peripheral groove formed therein to receive a portion of a tubing workpiece. The apparatus also includes a pressure die movably attached to said support frame. The pressure die has a reciprocally movable first pressure applicator for applying pressure to a follower slide; and a follower slide which is slidably attached to said first pressure applicator. The follower slide includes an inner face having an arcuate cutout channel formed therein to receive a portion of a tubing workpiece therein substantially opposite the bend die. The apparatus also includes a bend arm assembly for bending a tubing workpiece against the bend die. The bend arm assembly is rotatably movable about the pivot axis of the bend die. The invention also encompasses a method of using the vertically oriented tubing bender to bend a piece of tubing stock.

8 Claims, 5 Drawing Sheets

VERTICALLY ORIENTED APPARATUS FOR BENDING TUBING, AND METHOD OF USING SAME

CROSS-REFERENCE TO RELATED APPLICATIONS

This application claims benefit of Provisional Appln 60/110,777 filed Dec. 3, 1998.

The present application is a continuation-in-part of U.S. patent application serial No. 08/611,396, now U.S. Pat. No. 5,862,697 filed Mar. 5, 1996, the disclosure of which is hereby incorporated by reference, insofar as it is consistent herewith. The present application is also a continuation Ser. No. 09/143,598, now U.S. Pat. No. 5,927,124 filed Aug. 31, 1998, the disclosure of which is incorporated by reference, insofar as it is consistent herewith.

BACKGROUND OF THE INVENTION

1. Field of the Invention

The present invention relates to a vertically oriented apparatus for bending metal tubing. More particularly, the present invention relates to an automated and computer controlled apparatus for bending tubing, in which the height of the apparatus is greater than the width thereof, in order to occupy less floor space than is required for a conventional tube bending machine, and in which tubing stock is moved along a substantially vertical path.

2. Description of the Background Art

Many different types of tube bending machines are known and commercially available. Some examples of tubing benders may be found in U.S. Pat. Nos. 3,724,256, 4,126,030, 4,606,250, 4,703,678 and 5,025,651.

However, it is believed that all of the known tubing benders are mounted on a horizontally oriented support frame or base, and move a piece of tubing stock therethrough along a substantially horizontal path. This conventional arrangement of the machine takes up a large floor space in a manufacturing facility, which tends to be relatively expensive.

A need still exists in the art for an improved tube bending apparatus, which includes tube moving and bending components mounted on a support frame which takes up less floor space in a manufacturing plant than the previously known tubing benders.

SUMMARY OF THE INVENTION

The present invention provides a vertically oriented tube bending apparatus, which takes up less floor space than the previously known tubing benders.

A tube bending apparatus in accordance with the present invention, generally, includes a support frame having a length, a width, and a height, wherein the greatest of these is the height.

The apparatus further includes a tubing advance mechanism, attached to the support frame, for moving a tubing workpiece therethrough along a substantially vertical path. A bend die is also provided which is rotatably attached to the support frame and pivotally movable about a pivot axis. The bend die has an outer side edge with an arcuate peripheral groove formed therein to receive a portion of a tubing workpiece.

The apparatus also includes a pressure die movably attached to said support frame. The pressure die has a reciprocally movable first pressure applicator for applying pressure to a follower slide; and a follower slide which is slidably attached to said first pressure applicator. The follower slide includes an inner face having an arcuate cutout channel formed therein to receive a portion of a tubing workpiece therein substantially opposite the bend die.

The apparatus also includes a bend arm assembly for bending a tubing workpiece against the bend die. The bend arm assembly is rotatably movable about the pivot axis of the bend die, and may be integrally formed therewith.

The present invention also encompasses a method of using the vertically oriented tubing bender to bend a piece of tubing stock.

Accordingly, it is an object of the present invention to provide a method and apparatus for moving a piece of tubing stock through a tube bending machine along a path which is substantially vertically oriented, and for bending the tubing in a selected, predetermined way.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE PRESENTLY PREFERRED EMBODIMENTS

Overview

Figure 1:
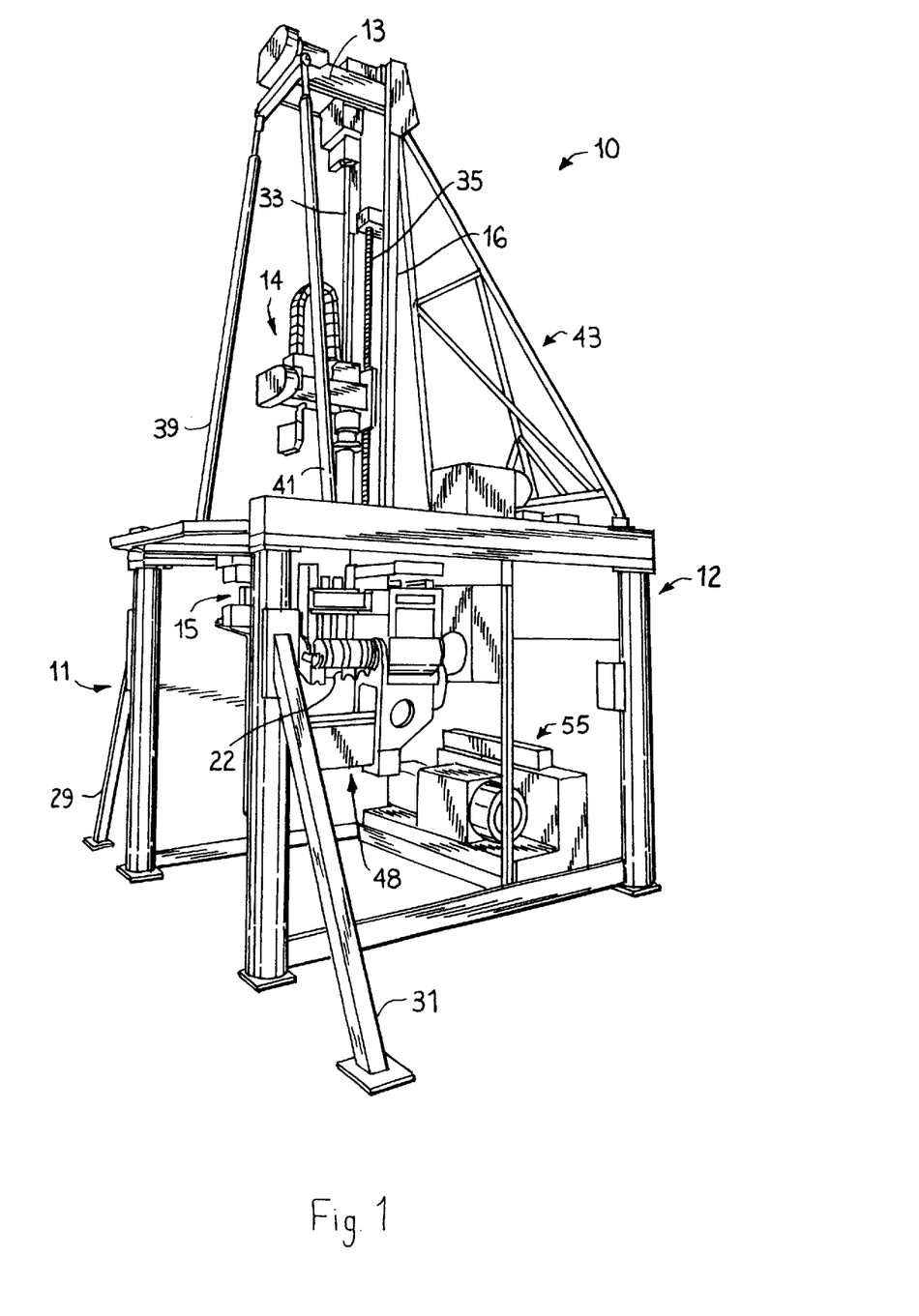
FIG. 1 is a perspective view of a vertically oriented apparatus for bending and cutting tubing, in accordance with the present invention.
Figure 2:
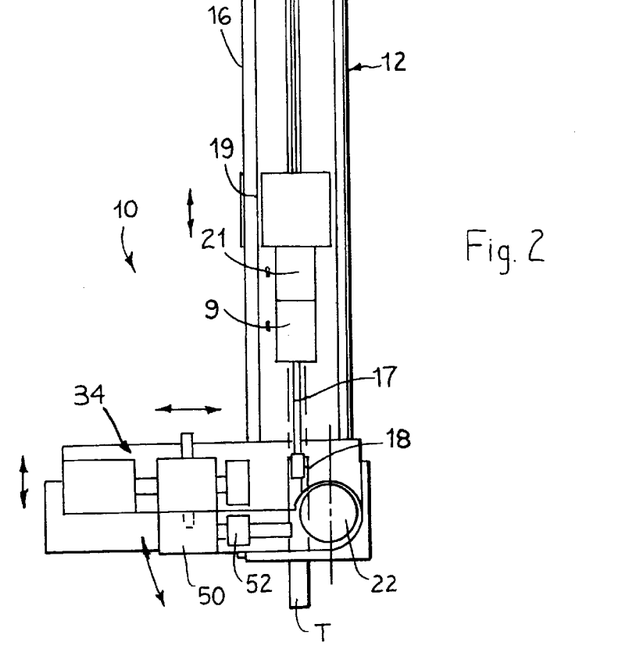
FIG. 2 is a simplified side plan view of an apparatus in accordance with the present invention, shown at a time before a section of tubing is bent.
Figure 3:
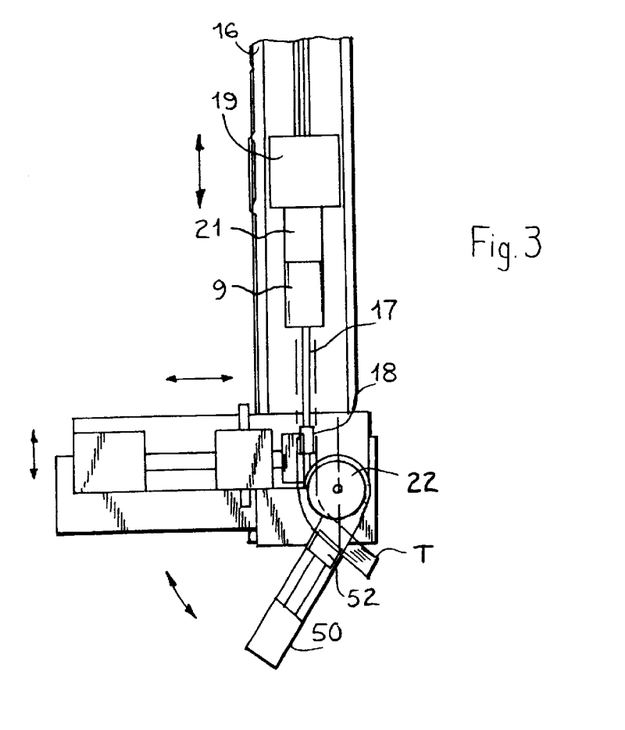
FIG. 3 is a simplified side plan view of the apparatus of FIG. 1, shown at a later time after, a section of tubing is bent.
Figure 9:
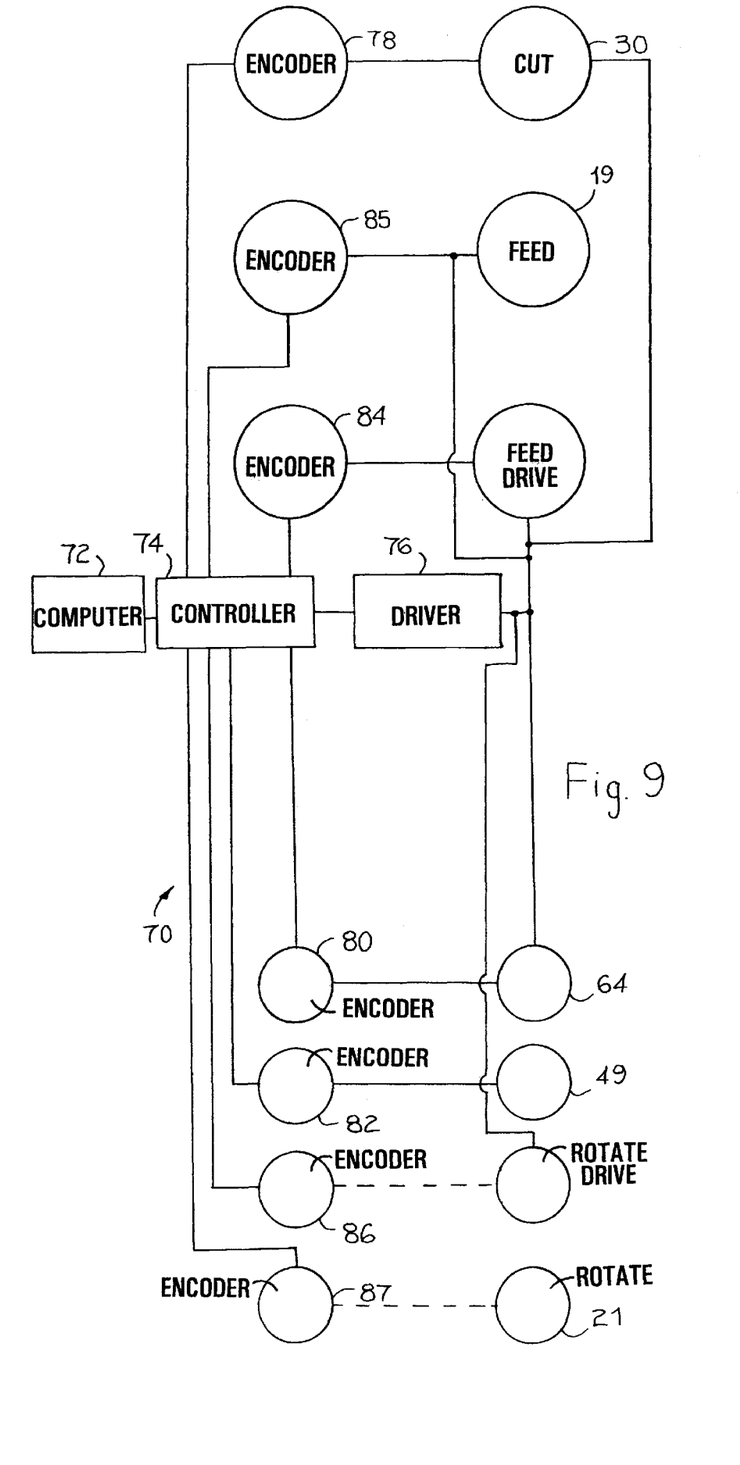
FIG. 9 is a schematic view of a control system in accordance with the present invention.

Referring now to the drawings, and particularly to FIGS. 1–3 thereof, a vertically oriented apparatus for bending and cutting tubing is shown generally at 10. The apparatus 10 includes a support frame 12 and a tubing advance mechanism 14, attached to the support frame, for advancing a tubing workpiece T therealong. Other components of the apparatus include a bend die 22, a pressure die assembly 34 (FIG. 2), a bend arm assembly 48, a cutter mechanism 15, and a programmable electronic controller 23 (FIG. 9). Each of these components and subassemblies will be discussed in further detail below.

The Support Frame and Tubing Advance Mechanism

The support frame 12 includes a number of different pieces, and is preferably made of a strong metal such as cast iron or steel. As best seen in FIG. 1, the support frame 12 includes a roughly cube-shaped cage 11 reinforced by opposed support braces 29, 31, disposed at an angle of approximately 45 degrees with respect to the vertical, as shown. A vertical rail member 16 is also provided as part of the support frame 12, attached to and extending upwardly from the cage 11. The vertical rail member includes a flattened back section with two transverse side sections attached to opposite sides of the back section, and is substantially U-shaped in cross section. A horizontal crossover bar 13 is provided attached to the top of the vertical rail member 16, for cooperating therewith to provide a support structure for supporting two cylindrical, parallel, vertically oriented guide members 33, 35 in front of the vertical rail member 16. The aforementioned guide members 33, 35 are a fixed-in-place smooth cylindrical guide rod 33 and a rotatable, externally threaded drive shaft 35. The drive shaft 35 is part of the tubing advance mechanism 14, and is rotatably mounted to the crossover bar 13, preferably with a sealed bearing therearound where it connects thereto.

The support frame 12 also includes a pair of opposed reinforcing struts 39, 41 supportively connecting the front of the crossover bar 13 to the top of the cage 11. Another component of the support frame 12 is an A-shaped brace assembly 43 supportively and reinforcingly connecting the top end of the vertical rail member 16 to the top of the cage.

Figure 4:
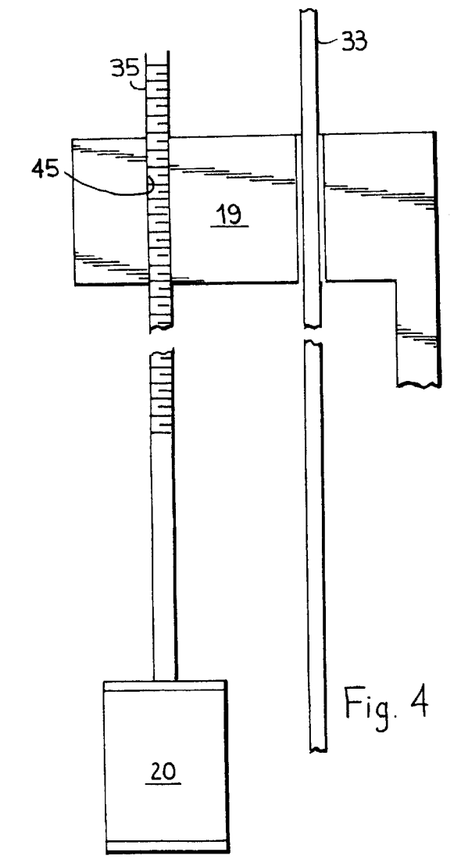
FIG. 4 is a simplified detail side view, partially cut away and partially in cross section, of a drive means for the apparatus, including a drive head, a motor, and a pair of guide members.

The tubing advance mechanism 14 also includes a motor 20 (FIG. 4) for rotating the drive shaft 35, a collet 18, and a tubing advance head 19 movably mounted to the drive shaft 35 for advancing the collet 18 downwardly along the rail member.

The tubing advance head has an internally threaded bore 45 formed therethrough which threadably receives the drive shaft 35 therein. This arrangement allows the tubing advance head 19 to move vertically up and down, guided by slidable movement along the guide rod 33, in response to rotatable movement of the drive shaft 35.

The collet 18 is attached to the tubing advance head 19, and is provided for supportively holding an end of the tubing workpiece T thereon. The collet 18 may be of an inside diameter type or an outside diameter type. The tubing advance mechanism 14 may include a support shaft 17 for the collet 18 (FIGS. 2–3).

The tubing advance mechanism 14 further includes a carriage 9 to which the collet 18 is connected, and a tube rotating member 21. The tube rotating member 21 provides for carefully controlled rotatable movement of the collet, with a tubing workpiece T thereon, about its own longitudinal axis, so that multiple bends may be made in a section of tubing, and these bends may be disposed in different planes, where desired.

As an alternative equivalent arrangement to the use of the motor 20 and the threaded drive shaft 35, the tubing advance head 19 may be driven by an electric motor linked to a ring and pinion gear arrangement (not shown), or by a hydraulically actuated piston (not shown).

The Bend Die

The apparatus 10 also includes a roughly disc-shaped bend die 22, which is rotatably attached to the support frame 12. The bend die 22 is pivotally movable about a pivot axis 24. The bend die 22 is provided with a flattened tube-receiving die surface 25 having a curved recess 26 formed therein for nestingly receiving the tubing workpiece T when the bend die is in an initial orientation thereof.

In the embodiment depicted in FIG. 1, the bend die 22 is provided with several parallel curved recesses of different diameters, and the bend die may be moved horizontally to line up a desired recess corresponding to the size of tubing needed for a particular job. In the other Figures of the drawings, a more conventional bend die is shown having only a single curved recess 26 therein. The bend die 22 is preferred to be be removable and interchangable, and to be integrally formed with the bend arm.

Figure 5:
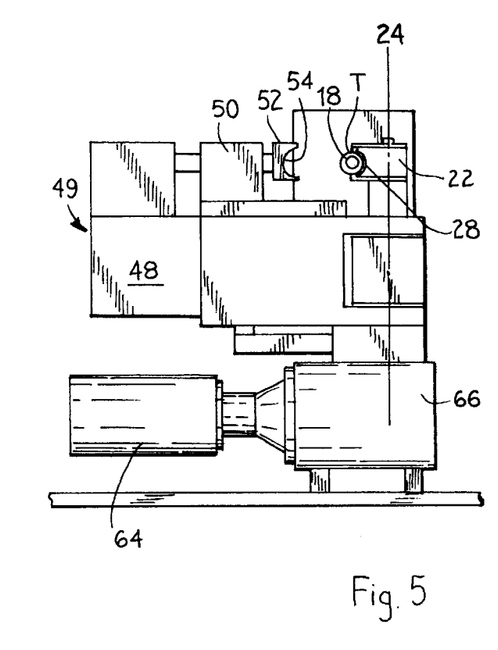
FIG. 5 is an end plan view, partially cut away, taken from floor level looking up into the interior of the apparatus of FIG. 1.

The bend die 22 further has a rounded off profile at an outer side edge 27 thereof. The outer side edge 27 connects up to, and is coextensive with, the flattened die surface 25. The outer side edge 27 further has an arcuate peripheral groove 28 formed therein. The arcuate peripheral groove 28 defines an inner part of a toroidal space therein, which is disposed around the outer edge 27 of the bend die. As best seen in FIG. 5, the outer side edge 27 of the bend die 22 has a semi-circular cross section at the arcuate peripheral groove 28, to receive a portion of a tubing workpiece T therein.

The bend die 22 also has a first blade guide slot 30 (FIG. 6) formed therein to guidingly receive a first portion of a blade 32, at such time that a bend in a tubing workpiece T has been completed. The first blade guide slot 30 intersects and communicates with the arcuate peripheral groove 28 in the bend die 22.

The Pressure Die Assembly

The apparatus 10 also includes a pressure die assembly 34 which is movably attached to the support frame 12. The pressure die assembly 34 includes a reciprocally movable first pressure applicator 36 and a follower slide 38, which is slidably attached to the first pressure applicator.

The first pressure applicator 36 is provided for applying pressure to the follower slide 38. The first pressure applicator 36 may include a hydraulic piston, or an electric drive mechanism. The first pressure applicator 36 includes a reciprocally movable slide receiving member 37, in which the follower slide 38 is slidably received. As indicated by the two-headed arrow on the first pressure applicator 37 in FIG. 6, the first pressure applicator is reciprocally movable in a direction which is transverse to the direction of movement of the follower slide 38.

The follower slide 38 is slidably attached to the first pressure applicator 36, as noted, and includes an inner face 40 having an arcuate cutout channel 42 formed therein, to receive a portion of a tubing workpiece T therein, substantially opposite the arcuate peripheral groove 28 of the bend die 22.

The follower slide 38 also has a second blade guide slot 44 formed therein (FIG. 5), to recieve a second portion of the blade 32 at such time as a bend is completed in a tubing workpiece T, and the first and second blade guide slots 30, 44 are aligned with one another. The second blade guide slot 44 intersects and communicates with the arcuate cutout channel 42 in the follower slide.

Figure 6:
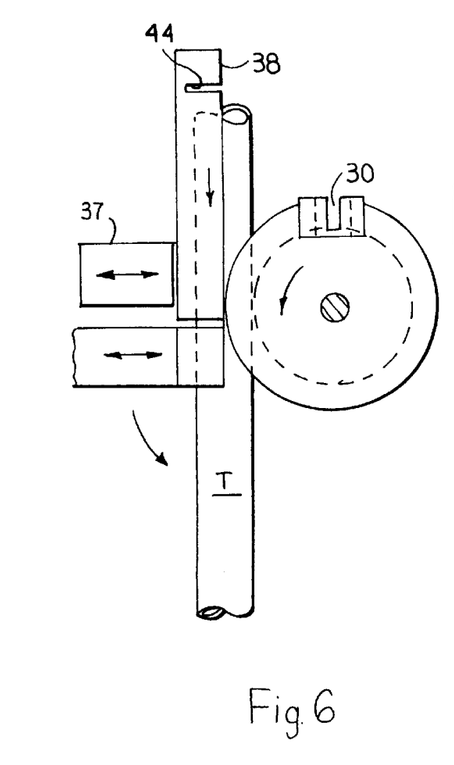
FIG. 6 is a simplified detail side plan view of a section of the apparatus of FIG. 1, shown at a time before the tubing is bent.
Figure 7:
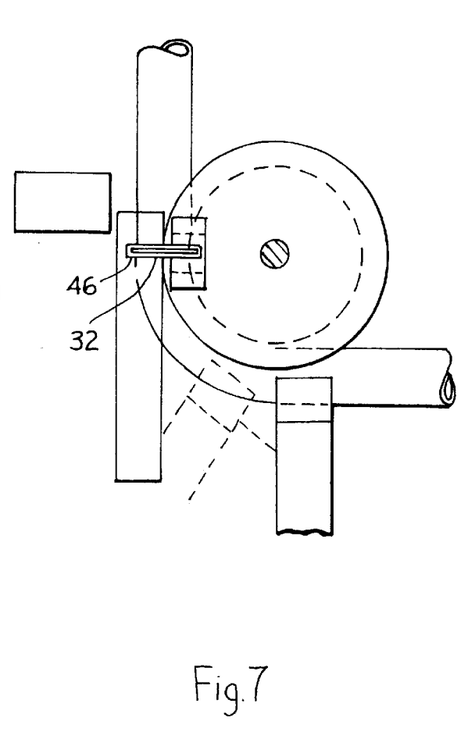
FIG. 7 is a simplified detail side plan view of a section of the apparatus of FIG. 1, shown at a time after the tubing is bent.

Under certain conditions, after a section of the tubing workpiece T has been bent into a preferred orientation thereof, as seen in FIG. 6, the second blade guide slot 44 of the follower slide 38 is alignable with the first blade guide slot 30 of the bend die 22 to define a blade guide path 46. In general, after a bending operation is complete, the pressure on the pressure die is temporarily released, and the bend die 22 and follower slide 38 are then re-oriented so that the first and second blade guide slots are aligned with one another, to form the blade guide path 46.

The Bend Arm Assembly

The apparatus 10 further includes components for bending a tubing workpiece T against the bend die 22. In the preferred embodiment of the apparatus, the bending components include a bend arm assembly 48 which is pivotally attached to the support frame, and which includes parts which are movable in at least two independent directions. An at rest position of the bend arm assembly 48 is shown in phantom in FIG. 1, while a pivotally rotated position of the bend arm assembly is shown in solid lines in FIG. 1.

The bend arm assembly 48 is preferred to be fixedly attached to the bend die 22, for concurrent movement therewith around the pivot axis 24 of the bend die 22. The bend arm assembly 48 includes a bend arm 49 which may be integrally formed with the bend die for concurrent movement therewith.

The bend arm assembly 48 also includes a reciprocally movable second pressure applicator 50, attached to the bend arm 49, for applying pressure to a tube-contacting die 52. The bend arm 49 also includes a tube-contacting die 52, attached to the second pressure applicator 50 for reciprocal movement thereof between a retracted position, shown in FIG. 4, and an extended position, shown in FIG. 3, in which the tube-contacting die contacts the tubing workpiece T. The tube-contacting die may be pivotally movable using a lining assembly (not shown), so that it may be dropped out of the way when not needed, to allow for easier removal of a finished tubing section.

The tube-contacting die 52 has an inner face 53 with an arcuate cutout recess 54 formed therein to receive a portion of a tubing workpiece T therein substantially opposite the arcuate groove 28 of the bend die 22. The bend arm assembly 48 further includes a bend arm driver 55 for radially moving the bend arm 49 with respect to the bend die pivot axis 24. In the preferred embodiment of the present invention, the bend arm driver 55 includes a bend arm drive motor 64 and associated gearing 66.

The Cutter

As previously noted, the apparatus 10 further includes a tube cutter mechanism 15, which may be housed inside a protective cage for safety purposes. The tube cutter mechanism 15 is connected to the cage 11 of the support frame 12. The cutter mechanism 15 includes a blade holder 60 (FIG. 8) for holding and supporting a blade 32. In the preferred embodiment of the apparatus 10, the blade holder 60 is adjustably mounted to a support member 58 which is attached to the support frame 12. Preferably, a blade 32 is also provided which is fixedly and removably attached to the blade holder 60. A reciprocally movable blade actuator 62 is also provided for reciprocally moving the blade holder 60 between a retracted position and an extended position thereof. The blade actuator 62 may be hydraulically or electrically driven. In the retracted position, the blade holder 60 is spaced apart from the bend die 22, as shown in solid lines in FIG. 8. In the extended position, the blade holder 60 is disposed adjacent the bend die 22, as shown in phantom in FIG. 8, and drives the attached blade 32 to pierce and cut through the tubing T, passing through the blade guide path 46 formed by the aligned first and second blade guide slots 30, 44.

The Control Mechanism and Dual Feedback Loop

Figure 8:
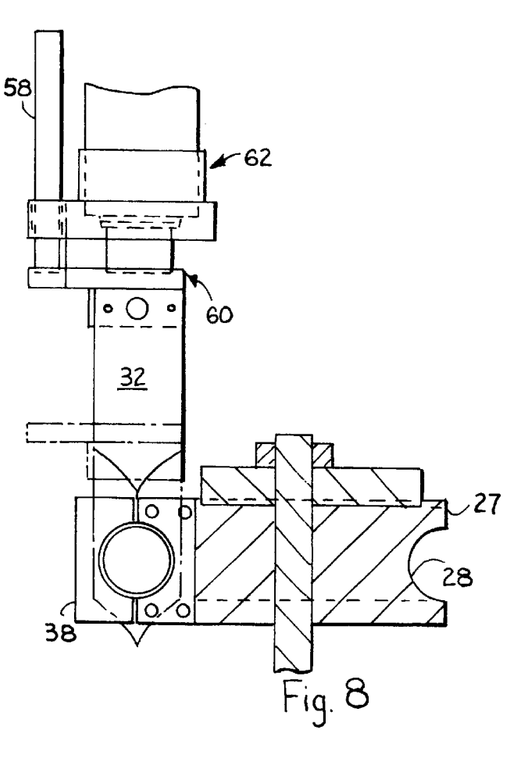
FIG. 8 is a detail view, taken along a horizontal plane and partially in cross-section, of a cutting mechanism of the apparatus of FIGS. 1–5, showing a blade holder and a blade in a retracted position, and also showing an extended position of the blade and blade holder in phantom.

The present invention preferably includes a control system 70 for programmably controlling the tube bending and cutting operation. Referring now to FIG. 8, a control system 70 is shown schematically. In a preferred embodiment of the invention, the control system 70 preferably includes a computer 72, a controller unit 74, driving member 76, and a plurality of encoders such as encoder 78, as shown. Controller unit 74 is preferably a motion controller that is in electrical communication with the computer 72. The controller unit 74 may be a conventional motion controller.

The controller unit 74 executes user supplied instructions (stored in the memory of the computer 72) and generates signals sent to the bend arm drive motor 64, the tubular workpiece feeding means 19, the tubular workpiece rotating means 21, and the cutting mechanism 15, so as to coordinate the necessary motion of each in performing a tube bending and cutting operation. The controller unit 74 is preferably capable of generating a plurality of modes of motion to the motor 64, the tubular workpiece feeding means 19, the tubular workpiece rotating means 21, and the cutting mechanism 15, including jogging, point-to-point positioning, linear and circular interpolation, and paths which are user-defined. Preferably, the motor 64 is operated as a servo motor.

In one embodiment of the invention, the computer 72 is a personal computer with the controller unit 74 connecting to the PC bus thereof. A software program, written in software language which the controller unit 74 is capable of understanding and interpreting so as to describe action which the apparatus must take in performing the tube bending operation, is preferably stored in memory in the computer 72. When the software program is operated, the commands are transferred to the controller unit 74 for execution.

The controller unit 74 preferably uses feedback from the bend arm rotating means 64, the tubular feeding means 19 and the tubular workpiece rotating means 21, so as to provide a closed loop system for efficiently controlling the motion thereof. As shown in FIG. 8, encoder 80, which is connected to motor 64, generates feedback signals that indicate the position thereof. The encoded signals are then used as input signals to the controller unit 74, so that the desired motion signals may be generated thereby, based on the current position of the motor 64 and the desired position as indicated in the user-supplied software program.

The present invention preferably includes means for substantially continuously eliminating backlash of the bend arm 49. The backlash eliminating means preferably includes a second encoder 82 (FIG. 8) which is connected to the bend arm 49 so as to generate a feedback signal which indicates the position thereof. By creating a dual loop feedback system, the controller unit 74 preferably uses feedback signals from the first encoder 80 for stabilizing the bend arm 49 and uses feedback signals from the second encoder 82 for accurately positioning the bend arm 49. As a result, the present invention substantially compensates for backlash or other effects pertaining to the bend arm 49 which may occur from prolonged use.

Similarly, controller unit 74 preferably accepts feedback from motive components of the tubular workpiece feeding means 19 and the tubular workpiece rotating means 21, so as to provide a closed loop circuit for efficiently controlling the operation thereof. As shown in FIG. 9, third and fourth encoders 84 and 86 are connected to the tubular workpiece feeding means and to the tubular workpiece rotating means 19, 21, respectively, so as to provide feedback to the controller unit 74. In addition, the tubular workpiece feeding means 19 and/or the tubular workpiece rotating means 21 may use a dual loop feedback system by including additional fifth and sixth encoders 85 and 87 which generate feedback signals based on the location and orientation, respectively, of the tubular workpiece T. As a result, the dual loop circuitry substantially compensates for backlash or other unwanted effects which may be associated with the tubular workpiece feeding means 19 and the tubular workpiece rotating means 21, due to prolonged use.

Method of Operating the Apparatus

As previously noted, the present invention also encompasses a method of bending and cutting a tubing workpiece T. A method in accordance with the present invention, generally, includes a first step of clamping a tubing workpiece T between a pressure die 34 and a bend die 22 which is rotatably movable about a pivot axis 24, wherein the bend die 22 and pressure die 34 are substantially as described above in the present specification. The pressure die 34 includes a follower slide 38 as hereinabove described.

The method according to the present invention includes a second step of pressing a portion of a bend arm 49 against the tubing workpiece T, opposite the bend die 22, and radially moving the bend arm about the bend die pivot axis 24, to bend the tubing workpiece against the bend die.

The method also includes a third step of concurrently advancing the tubing workpiece T and the follower slide 38 along a substantially vertical path, as the tubing workpiece is bent, until the first blade guide slot 30 is aligned with the second blade guide slot 44 to define a blade guide path 46.

The method according to the present invention further includes a fourth step of moving a blade 32 from a retracted position, spaced apart from the bend die 22, to an extended position adjacent the bend die, whereby the blade passes through the blade guide path 46, and cuts through the tubing workpiece T.

Although the present invention has been described herein with respect to a preferred embodiment thereof, the foregoing description is intended to be illustrative, and not restrictive. Those skilled in the art will realize that many modifications of the preferred embodiment could be made which would be operable. All such modifications which are within the scope of the claims are intended to be within the scope and spirit of the present invention.

I claim:

1. A vertically oriented apparatus for bending tubing, comprising:
   a) a support frame having a length, a width, and a height, wherein the greatest of these is the height;
   b) means, attached to the support frame, for advancing a tubing workpiece along a substantially vertical path;
   c) a bend die rotatably attached to the support frame and being pivotally movable about a pivot axis, said bend die having an outer side edge with an arcuate peripheral groove formed therein to receive a portion of a tubing workpiece;
   d) a pressure die movably attached to said support frame and comprising:
      a reciprocally movable first pressure applicator for applying pressure to a follower slide; and
      a follower slide which is slidably attached to said first pressure applicator and which comprises an inner face having an arcuate cutout channel formed therein to receive a portion of a tubing workpiece therein substantially opposite said bend die; and
   e) bending means for bending a tubing workpiece against said bend die, said bending means being rotatably movable about said pivot axis of said bend die;
   wherein said apparatus includes only a single bend die and a single pressure die, to minimize the amount of floor space taken up thereby.

2. The apparatus of claim 1, further comprising means for cutting said tubing.

3. The apparatus of claim 1, further comprising means for reinforcing said support frame.

4. The apparatus of claim 1, wherein said bending means comprises a bend arm movably attached to said support frame, said bend arm comprising:
   a) a reciprocally movable second pressure applicator for applying pressure to a tube-contacting die;
   b) a tube-contacting die attached to said second pressure applicator and having an inner face with an arcuate cutout channel formed therein to receive a portion of a tubing workpiece therein substantially opposite said bend die; and
   means for radially moving said bend arm with respect to said pivot axis of said bend die.

5. The apparatus of claim 3, wherein said reinforcing means comprises at least one brace.

6. A method ending and cutting a tubing workpiece, comprising the steps of:
   placing said tubing workpiece with a longitudinal axis thereof oriented substantially vertically;
   moving said tubing workpiece along a substantially vertical path;
   sending a signal from a first encoder to an electronic controller, said signal representing a position of said tubing workpiece;
   clamping said tubing workpiece between a pressure die and a bend die which is rotatably movable about a pivot axis said pressure die and said bend die being connected to a support frame having a length, a width, and a height, wherein the greatest of these is the height;
   said bend die having an outer side edge with an arcuate peripheral groove formed therein to receive a portion of said tubing workpiece;
   said pressure die being movably attached to said support frame and comprising:
      a) a reciprocally movable pressure applicator for applying pressure to a follower slide;
      b) a follower slide which is slidably attached to said pressure applicator and which comprises an inner face having an arcuate cutout channel formed therein to receive a portion of said tubing workpiece therein substantially opposite said bend die,;
   pressing a bend arm against said tubing workpiece opposite said bend die and radially moving said bend arm about said bend die pivot axis to bend said tubing workpiece against said bend die; and
   moving said tubing workpiece, said bend die, and said follower slide in a coordinated manner as said tubing workpiece is bent; wherein said follower slide is moved in a substantially vertical direction.

7. A vertically oriented apparatus for bending tubing, comprising:
- a support frame having a length, a width, and a height, wherein the greatest of these is the height;
- a tube advancing mechanism for advancing a tubing workpiece along a substantially vertical path, said tube advancing mechanism comprising a first electric motor;
- a bend die rotatably attached to the support frame and being pivotally movable about a pivot axis, said bend die having an outer side edge with an arcuate peripheral groove formed therein to receive a portion of a tubing workpiece;
- a pressure die movably attached to said support frame and comprising:
    - a reciprocally movable first pressure applicator for applying pressure to a follower slide; and
    - a follower slide which is slidably attached to said first pressure applicator and which comprises an inner face having an arcuate cutout channel formed therein to receive a portion of a tubing workpiece therein substantially opposite said bend die;
- a bending mechanism for bending a tubing workpiece against said bend die, said bending mechanism comprising a bend arm which is rotatably movable about said pivot axis of said bend die, and a second electric motor for moving said bend arm; and
- an electronic controller for controlling movement of said tube advancing mechanism and said bend arm.

8. The apparatus of claim 7, further comprising a first encoder associated with the tube advancing mechanism for generating a first signal, and a second encoder associated with the bend arm for generating a second signal;
- wherein the controller uses feedback from said first and second encoders in controlling movement of said tube advancing mechanism and said bend arm.

* * * * *